(12) United States Patent
Geng

(10) Patent No.: US 6,744,569 B2
(45) Date of Patent: Jun. 1, 2004

(54) METHOD AND APPARATUS FOR OMNIDIRECTIONAL THREE DIMENSIONAL IMAGING

(75) Inventor: Z. Jason Geng, Rockville, MD (US)

(73) Assignee: Genex Technologies, Inc, Kensington, MD (US)

(*) Notice: Subject to any disclaimer, the term of this patent is extended or adjusted under 35 U.S.C. 154(b) by 297 days.

(21) Appl. No.: 09/884,255

(22) Filed: Jun. 19, 2001

(65) Prior Publication Data

US 2003/0081952 A1 May 1, 2003

(51) Int. Cl.[7] .............................................. G02B 13/06
(52) U.S. Cl. ......................................................... 359/725
(58) Field of Search ..................... 348/36, 39; 359/725; 345/427

(56) References Cited

U.S. PATENT DOCUMENTS

| | | | |
|---|---|---|---|
| 5,612,533 A | 3/1997 | Judd et al. .................. 250/208.1 |
| 5,625,408 A | 4/1997 | Matsugu et al. ............... 348/42 |
| 5,760,826 A | 6/1998 | Nayar ........................... 348/36 |
| 5,790,181 A | 8/1998 | Chahl et al. ................... 348/36 |
| 5,905,568 A | 5/1999 | McDowell et al. ............ 356/28 |
| 5,920,337 A | 7/1999 | Glassman et al. ............. 348/36 |
| 5,920,376 A * | 7/1999 | Bruckstein et al. ............ 352/69 |
| 6,034,779 A | 3/2000 | Yamaura ...................... 356/614 |
| 6,064,423 A | 5/2000 | Geng ............................ 348/36 |
| 6,118,474 A | 9/2000 | Nayar .......................... 348/36 |
| 6,160,618 A | 12/2000 | Garner ........................ 356/318 |
| 6,304,285 B1 * | 10/2001 | Geng ............................ 348/36 |
| 6,545,702 B1 * | 4/2003 | Konolige et al. .............. 348/36 |
| 2001/0015751 A1 * | 8/2001 | Geng ............................ 348/36 |
| 2002/0046080 A1 * | 4/2002 | Kumata ....................... 359/293 |
| 2002/0141636 A1 * | 10/2002 | Wakamoto et al. .......... 382/154 |
| 2003/0007793 A1 * | 1/2003 | Suzuki .......................... 396/20 |
| 2003/0071891 A1 * | 4/2003 | Geng ............................ 348/39 |
| 2003/0081952 A1 * | 5/2003 | Geng ........................... 396/427 |

* cited by examiner

Primary Examiner—David N. Spector
(74) Attorney, Agent, or Firm—Steven L. Nichols; Paul W. Fish; Rader, Fishman & Grauer PLLC (57) ABSTRACT

An omnidirectional stereo imaging system includes a first omnidirectional imaging assembly having a first imaging device and a first omni-mirror, a second omnidirectional imaging assembly having a second imaging device and a second omni-mirror wherein focal centers of the first and second omni-mirrors and focal points of the first and second imaging devices are substantially coaxial and the virtual viewing points are separated by a predetermined distance.

19 Claims, 9 Drawing Sheets

METHOD AND APPARATUS FOR OMNIDIRECTIONAL THREE DIMENSIONAL IMAGING

FIELD OF THE INVENTION

This invention presents a set of methods and apparatus for omnidirectional stereo imaging. By "omnidirectional imaging system", we mean a system that is able to acquire images with a field-of-view covering the entire solid angle of a hemisphere ($2\pi$ steradians) without any mechanical moving parts. Consequently, the field of view of an omnidirection imaging system has an in plane view angle of 360 degrees. The field of view of a conventional camera or a light projector can be dramatically increased by employing a reflective mirror properly placed in front of the camera or the projector. A pair of omnidirectional cameras is able to form a unique stereo imaging system that is able to obtain three dimensional images of a surrounding scene with 360 degree view angle. A combination of an omnidirectional camera and an omnidirectional structured light projector cart also provide a means to obtain quantitative three dimensional measurements of the objects around the camera system. The omnidirectional three dimensional imaging methods and apparatus presented herein may offer unique solutions to many practical systems that need simultaneous 360 degree viewing angle and three dimensional measurement capability.

BACKGROUND

A number of approaches have been proposed in the past for imaging systems to achieve wide field-of-view (FOV). None of them, however, is able to generate 3D omnidirectional images.

Most existing imaging systems employ electronic sensor chips, or still photographic film, to record optical images collected by the imaging system's optical lens system. The image projection for most camera lenses is modeled as a "pin-hole" with a single center of projection. The sizes of camera lenses and imaging sensors have practical limitations, such that the light rays that can be collected by a camera lens and received by the imaging device typically form a cone having a very small opening angle. Therefore, angular field-of-views for conventional cameras are within a range of 5 to 50 degrees. For example, an 8.5 mm F/1.3 camera lens for 1/2" CCD (Charge Coupled Device) chip only has an angular FOV of 41.2 degrees.

Optical engineers have designed several versions of wide-viewing-angle lens system, called fish-eye lenses. See Wood, R.W., Fish-Eye View and Vision Underwater, Philosophical Magazine, 12 (Series 6):159–162, 1906; Miyamoto, K, Fish-Eye Lens, J. Optical Soc. America, 54(8):1060–1061, 1964. Fish-eye lenses feature a very short focal length which, when used in place of conventional camera lenses, enables the camera to view objects over much a wider angle (almost $2\pi$ steradians). In general, a wider FOV requires a more complicated design for the fish-eye lens. To obtain a hemispherical FOV, the fish-eye lens must be quite large in dimension, complex in optical design, and hence expensive. Also, it is very difficult to design a fish-eye lens that ensures single view point constraint, i.e., all incoming principal light rays intersect at a single point to form a fixed viewpoint. The use of fish-eye lenses for wide FOV imaging application has been advocated. See Oh, S.J, and Hall, E., Guidance of a Mobile Robot Using an Omni-directional Vision Navigation System, Proc. SPIE, 852:288–300, Nov.,1987; U.S. Pat. No. 5,359,363 issued to Kuban, D.P., et al, Oct. 25, 1994.

Although the image acquired by fish-eye lenses may prove to be good enough for some visualization applications, the distortion compensation issue has not been resolved. In addition, the high unit-cost issues remain to be major hurdles for its wide-spread application. The fish-eye lens technique adopts a statically positioned camera to acquire a wide angle of view. However, the nonlinear property resulting from the semi-spherical optical lens mapping makes the resolution along the circular boundary of the image very poor. Further, the field of view corresponding to the circular boundary of the image usually represents a ground or floor where a high resolution image is required.

Large field of view of objects may be obtained by using multiple cameras in the same system, each pointing in a different direction. However issues related to seamless integration of multiple images are further complicated by the fact that each image produced by each camera has different centers of projection. The cost for such a system is usually high. The image processing required by using multiple cameras or by rotating cameras in order to obtain precise information on position and azimuth of an object takes a long time, which is not suitable for real-time battle field modeling and reconnaissance applications.

Figure 1A:
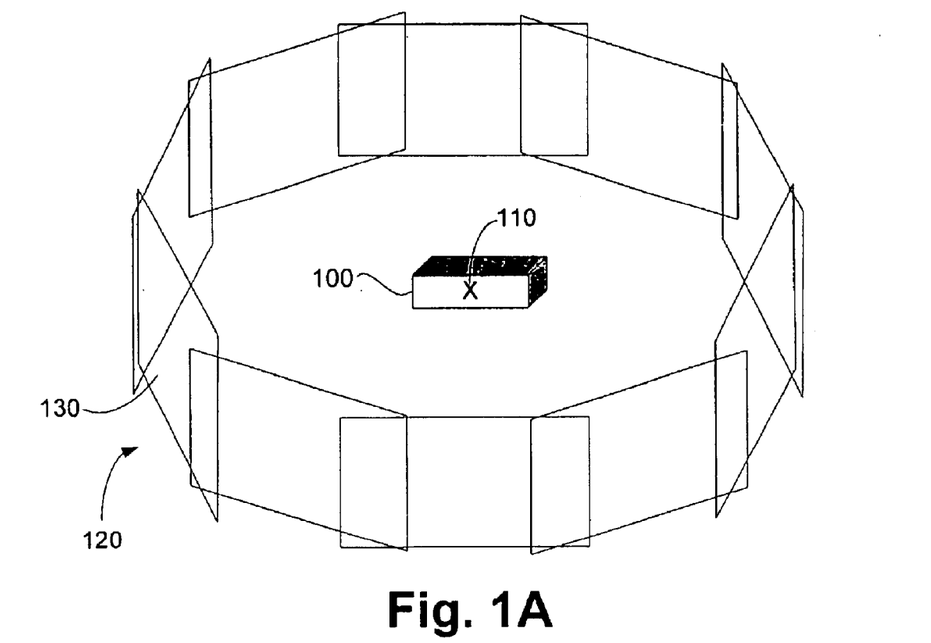
FIG. 1A illustrates a sequence of multiple views taken by a rotated camera.
Figure 1B:
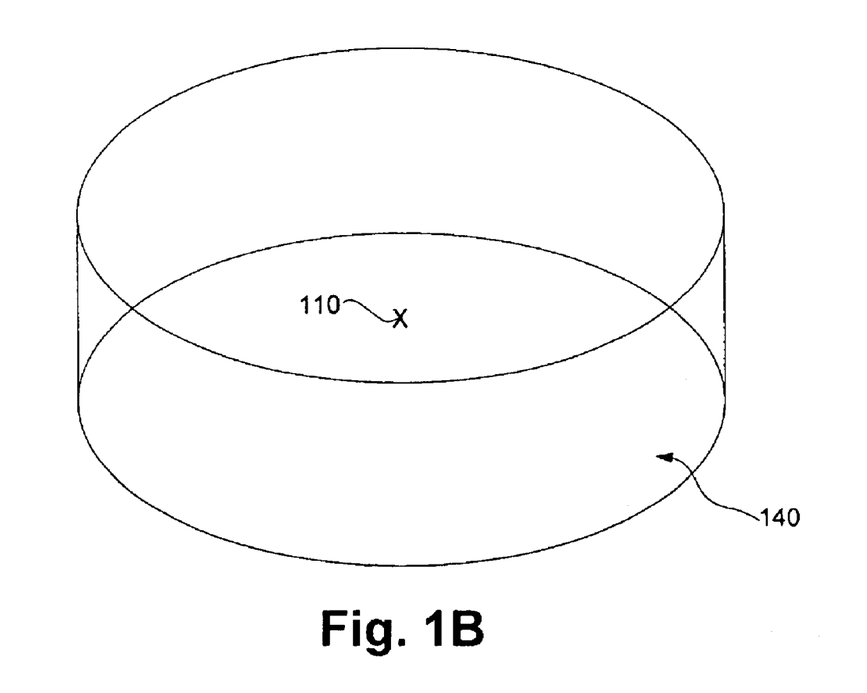
FIG. 1B illustrates the composition of multiple views of a rotated camera into a panoramic image.

Another straightforward solution to increasing the FOV is illustrated in FIGS. 1A–1B. An imaging system (100) is rotated about its center of projection (110). An image sequence (120) of individual images (130) is acquired by the imaging system (100) at different positions. The images (130) are "stitched" together to obtain a panoramic view of the scene (140) as seen in FIG. 1B. Such an approach has been recently proposed by several researchers. See Chen,S. E., QuickTime VR—An Image Based Approach to Virtual Environment Navigation, Computer Graphics: Proc. Of SIGGRAPH 95, 29–38, 1995; McMillam, L, and Bishop, G., Plenoptic Modeling: An Image-Based Rendering System, Computer Graphics: Proc. Of SIGGRAPH 95, 38–46, 1995; Zheng, J.Y., and Tsuji,S, Panoramic representation of scene for route understanding, Proc. 10 Int'l Conf. Pattern Recognition, 1:161–167, 1990. A very interesting approach has also been developed that employs a camera with a non-frontal images detector to scan the world. See Krishnan, A, and Ahuja, N., Panoramic Image Acquisition, Proc. Of IEEE Conf. Computer Vision and Pattern Recognition (CVPR-96), 379–384,1996.

The first disadvantage of any rotating image system is that it requires the use of moving parts and precision positioning devices. A more serious drawback is that such systems lack the capability of simultaneously acquiring images with wide FOV. Although such systems can acquire precise azimuth information in omnidirectional view, the imaging process is time-consuming and the method is not applicable to real-time problems such as avoiding collision against moving obstacles or monitoring scene with mobile objects. This restricts the use of rotating systems to static and/or non-real-time applications.

Figure 2A:
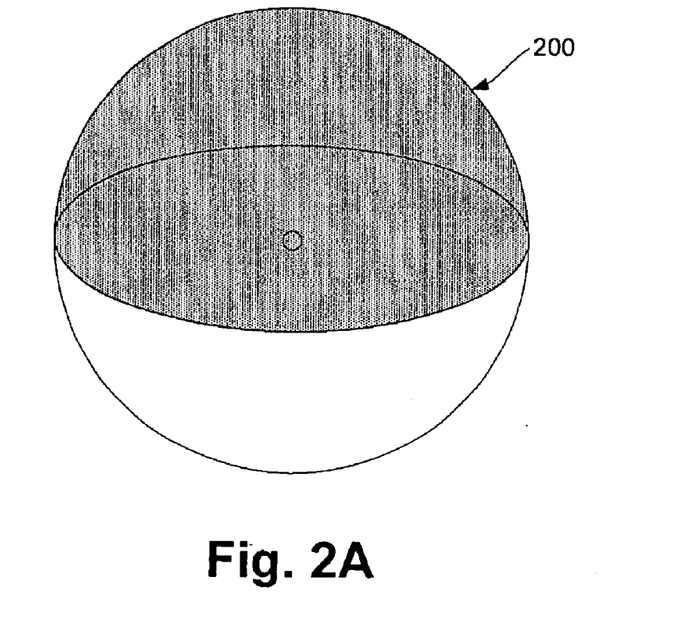
FIG. 2A illustrates the Field of View (FOV) of an omnidirectional camera.
Figure 2B:
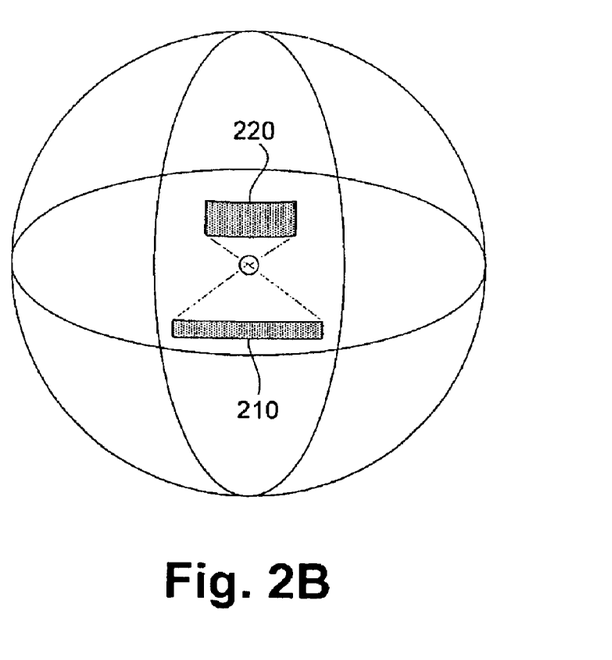
FIG. 2B illustrates the FOV of conventional and panoramic cameras.

In contrast the present apparatus is capable of capturing real-time omnidirectional images without using any moving parts. By "omnidirectional images", we mean images with a field-of-view covering an entire hemisphere ($2\pi$ steradians of solid angle) simultaneously. FIGS. 2A–2B provide a comparison between fields of view of the present omnidirectional camera (200) and those of panoramic (210) and conventional (220) cameras as illustrated by the shaded portions (200–220). As one can see, a panoramic camera is not omnidirectional, since it can only provide a wide-angle of FOV at certain time instances. Further, this FOV is not in all directions. On the other hand, the field of view of the omnidirectional camera (200) covers an entire hemisphere or 2π steradians of solid angle.

SUMMARY

The primary objective of present invention is to provide a set of simple methods and apparatus to obtain simultaneously omnidirectional stereo images without requiring the use of moving parts. Accordingly, an improved imaging apparatus for generating a two dimensional image, includes a substantially hyperbolic reflective mirror configured to satisfy an optical single viewpoint constraint for reflecting a scene, an image sensor responsive to the reflective mirror and that generates two dimensional image data signals, and a controller coupled to the image sensor to control a display of two dimensional object scenes corresponding to the image data signals. The field of view of a conventional camera or a light projector can be dramatically increased by employing a reflective mirror properly placed in front of the camera or the projector. A pair of omnidirectional cameras is able to form a unique stereo imaging system that is able to obtain three dimensional images of surrounding scene with 360 degree view angle. A combination of an omnidirectional camera and an omnidirectional structured light projector can also provide a means to obtain quantitative three dimensional measurements of the objects around the camera system. The omnidirectional three dimensional imaging methods and apparatus presented herein may offer unique solutions to many practical systems that need simultaneous 360 degree viewing angle and three dimensional measurement capability.

DETAILED DESCRIPTION

The field of view of an imaging system may be increased by using a reflective surface, such as a convex mirror, with a properly designed surface profile. The rear-view mirror in a car is a daily example of using reflective mirror to increase the FOV of a driver.

Figure 3A:
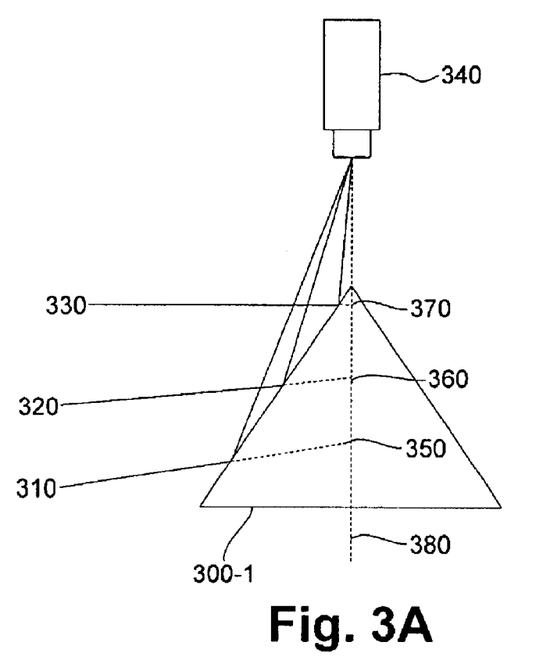
FIG. 3A illustrates a conical minor for omnidirectional imaging.
Figure 3B:
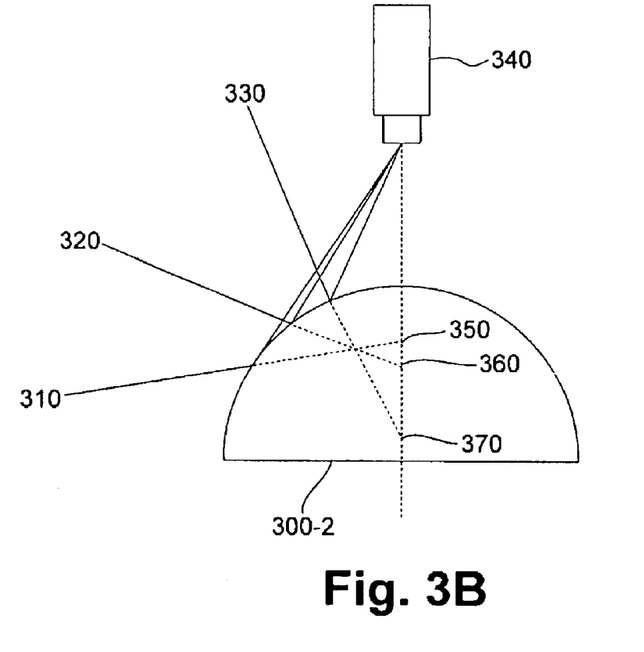
FIG. 3B illustrates a spherical mirror for omnidirectional imaging.
Figure 3C:
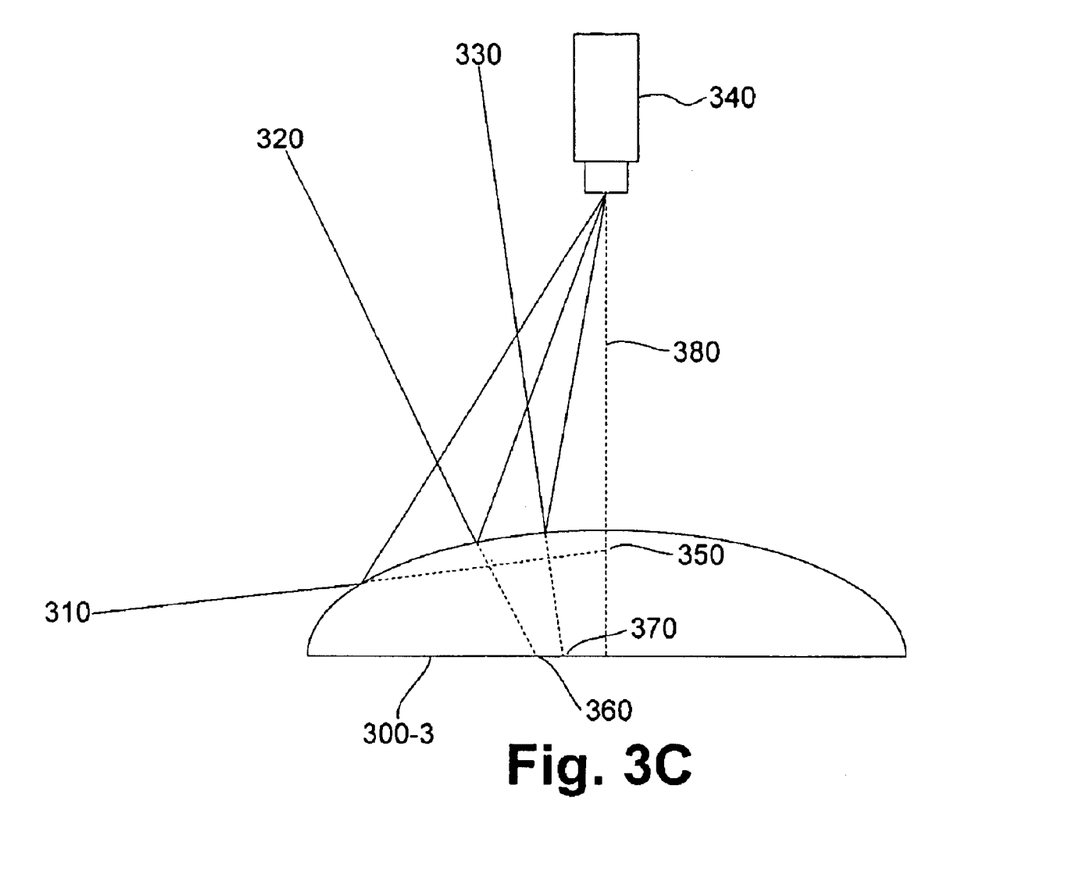
FIG. 3C illustrates a parabolic mirror for omnidirectional imaging.

There are a number of surface profiles that can be used to produce omnidirectional FOV. FIGS. 3A–3C illustrate three examples. FIG. 3A illustrates a conic mirror (300-1), FIG. 3B illustrates a spherical mirror (300-2), and FIG. 3C illustrates a parabolic mirror (300-3). The optical geometry of these convex mirrors provides a simple and effective means to convert a video camera's planar view into an omnidirectional view around the vertical axis of these mirrors, without using any moving part. This is accomplished by directing light rays (310, 320, 330) from the surrounding to a camera (340).

An image is a two dimensional pattern of brightness (or colors). A satisfactory imaging system preserves such characteristics as:

(1) Geometric correspondence: There must be a one-to-one correspondence between pixels in an image and point in the scene.

(2) Single Viewpoint Constraint: Each pixel in the image corresponds to a particular viewing direction defined by a ray from that pixel on image plane through a single viewing point or "pinhole."

As discussed, the profiles illustrated FIG. 3 can greatly increase the FOV, and may prove adequate for certain omnidirectional scene monitoring applications. The reflecting surfaces illustrated in FIGS. 3A–3B do not preserve the single viewpoint constraint (SVC). For a high quality omnidirectional imaging system, all the light rays coming in the omni imager head should substantially share a single virtual viewing point. In contrast, the light ray extensions (350, 360, 370) do not share a single virtual viewpoint on a rotational axis (380) of the system.

A single viewpoint constraint shall be broadly understood to mean that all the extensions of light rays reflected by the mirror must pass through a single, albeit virtual, viewpoint. A reflective surface that meets this constraint and the one-to-one pixel correspondence constraint will be referred to as an omni-mirror for ease of reference.

Figure 4:
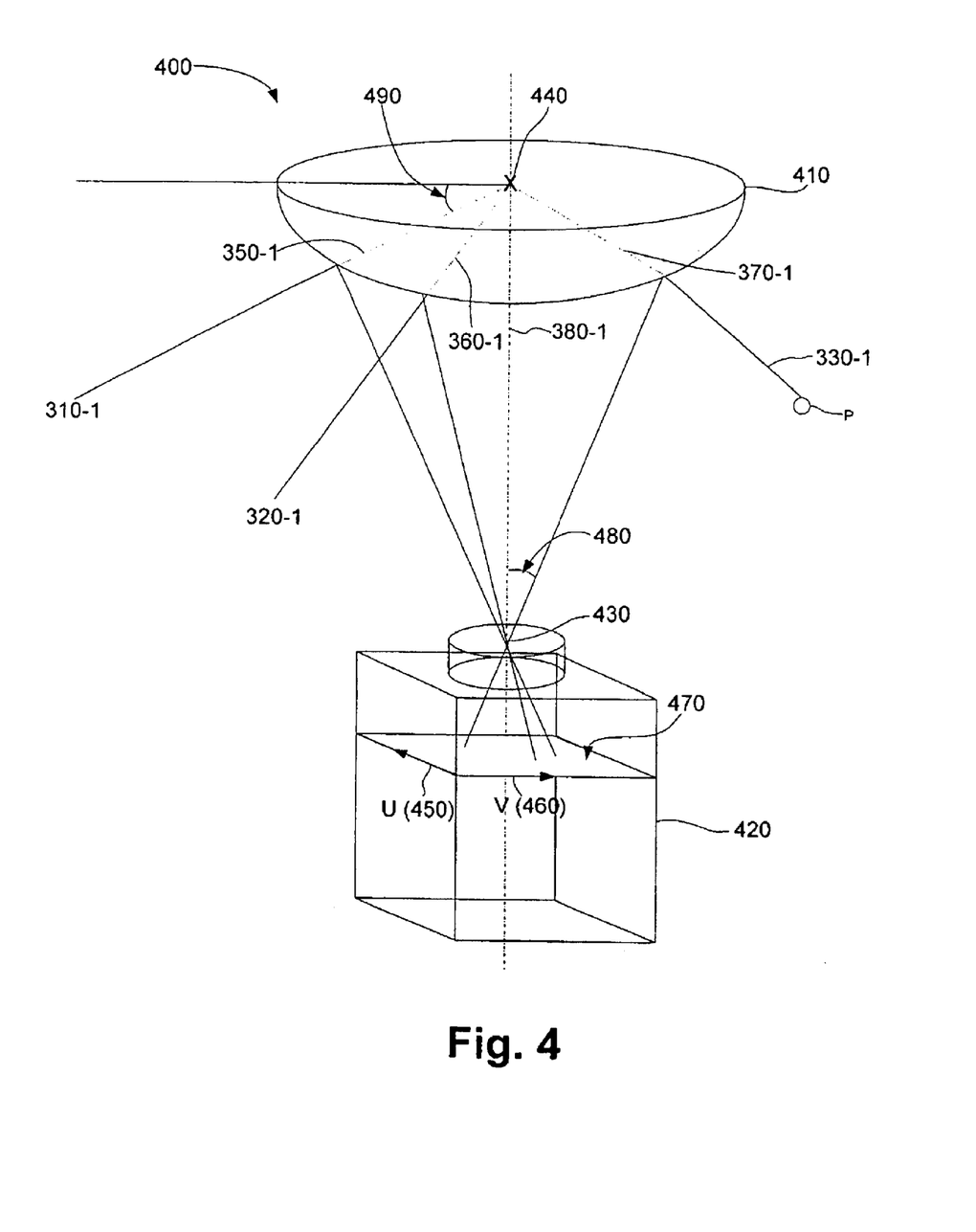
FIG. 4 illustrates an omnidirectional imaging system according to one exemplary embodiment.

FIG. 4 illustrates an omni-directional imaging assembly (400) that includes an omni-mirror (410) and an imaging device such as a video camera (420). The video camera (420) may be any suitable video camera, such as an off-the-shelf video camera with a regular lens with a FOV that covers substantially the entire surface of the omni-mirror (410). Off-the-shelf video cameras and lenses are rotationally symmetric. As a result, the cross-section function z(r) that defines the mirror surface cross section profile remains as the undetermined variable. Accordingly, the omni-mirror (410) is then the solid of revolution obtained by sweeping the cross-section about an optical axis (380-1) of the omnidirectional imaging assembly (400). The function of the omni-mirror (410) is to reflect all viewing rays (310-1, 320-1, and 330-1) to the video camera's viewing center or focal point (430) from the surface of physical objects in the field-of-view. This reflection is such that all the incident portions of the light rays (310-1, 320-1, and 330-1) that reflect off of the omni-mirror (410) have projections (350-1, 360-1, and 370-1) that extend toward a single virtual viewing point (440) at the focal center of the omni-mirror (410). In other words, the omni-mirror (410) effectively steers the viewing rays (310-1, 320-1, and 330-1) such that the camera (420) equivalently sees the objects in the world from a single viewing point (440).

FIG. 4 illustrates a hyperboloid as shape of the omni-mirror (410). A well-know feature of a hyperbolic curve is that the extensions (350-1, 360-1, and 370-1) of any ray (310-1, 320-1, and 330-1) reflected by the hyperbolic curve originated from one of its focal points passes through its other focal point. If we choose the hyperbolic profile for the omni-mirror such that all the extensions (350-1, 360-1, and 370-1) pass through one focal point at the viewing point (440), and place the focal point (430) of a video camera (420) at the other focal point of the hyperbolic curve, as shown in FIG. 4, the imaging assembly (400) will have a single virtual viewpoint (440) as if the video camera (420) were placed at the virtual viewing location (440).

The mathematical equation that describe the hyperbolic omni-mirror surface profile is:

$$\frac{(z-c)^2}{b^2} - \frac{r^2}{a^2} = 1, \text{ where } c = \sqrt{a^2+b^2} \text{ and } f = 2c. \quad (1)$$

The extension of the incoming light rays (350-1, 360-1, and 370-1) sensed by the camera (420) is always passing through a single virtual viewpoint (440) regardless of the location of the projection point on the minor surface.

For any point P in the scene, the image reflected from the omni-mirror (410) to image sensor's image plane (470) has the radius of $d_c$:

$$d_c = \sqrt{u^2+v^2} \quad (2)$$

where u (450) and v (460) are the pixel indexes on the image plane (470). As shown in FIG. 4, the camera viewing angle $\gamma_c$ (480) corresponding to the point on the scene is given by:

$$\gamma_c = \tan^{-1}\frac{d_c}{f_c} \quad (3)$$

The incoming light rays z (350-1, 360-1, and 370-1) to the camera can be described by a line equation:

$$z = \frac{r}{\tan\gamma_c} - f \quad (4)$$

Omitting details of mathematical derivation based on the omni-mirror equation (1), we can obtain a simple closed-form relationship between the omnidirectional viewing angle α (490) and the camera's viewing angle $\gamma_c$ (480):

$$\alpha = \tan^{-1}\frac{2bc - (b^2+c^2)\cos\gamma_c}{a^2\sin\gamma_c} \quad (5)$$

This equation establishes a one-to-one corresponding relationship between α and $\gamma_c$. This relationship is important when we perform triangulation calculation in the omnidirectional 3D camera system.

Figure 5:
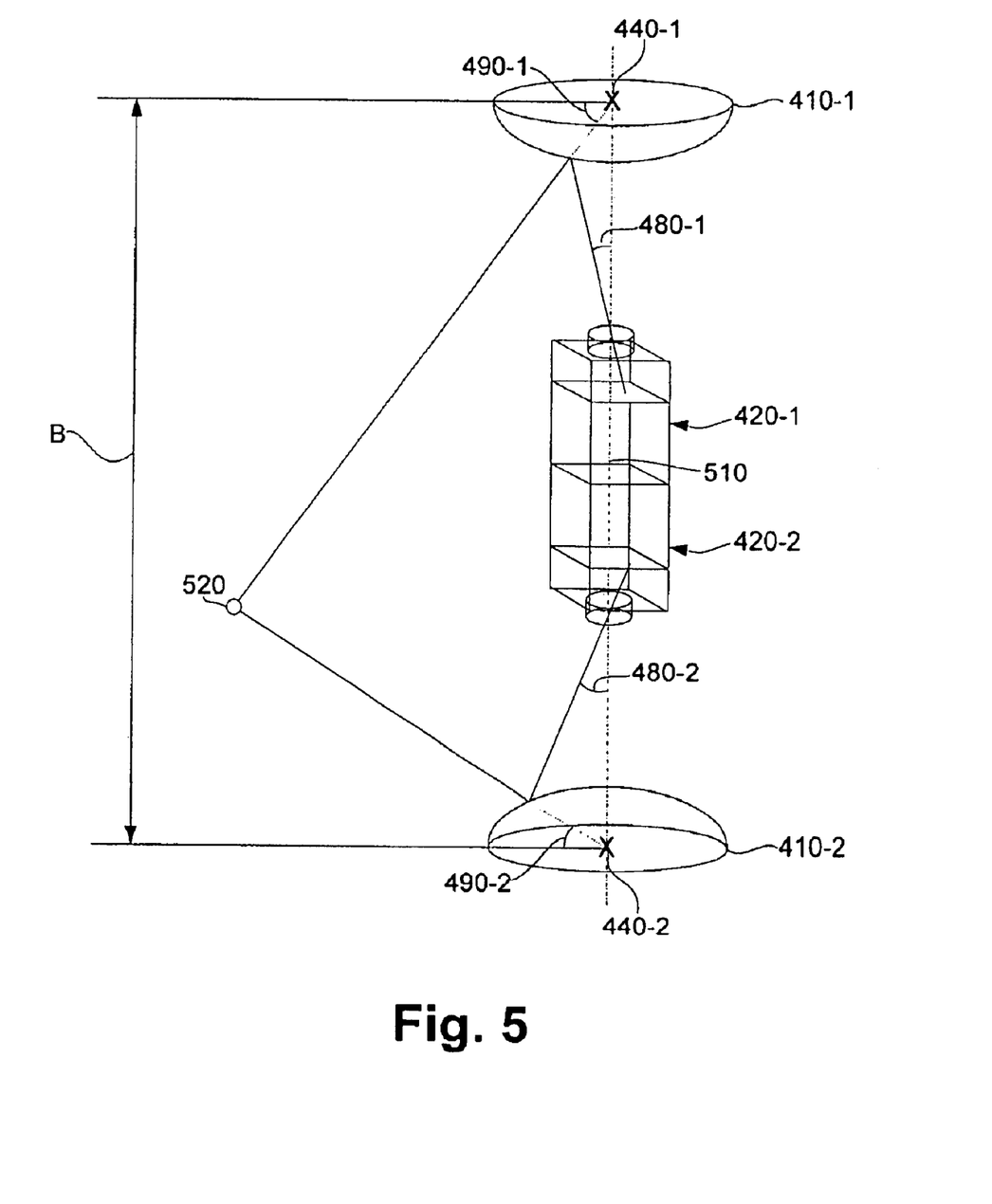
FIG. 5 shows an omnidirectional stereo camera according to one exemplary embodiment.

FIG. 5 shows a possible configuration of the omnidirectional stereo camera (500). Two omni-mirrors (410-1, 410-2) are placed face-to-face and share a common optical axis (510). Two virtual imaging centers (440-1, 440-2) are separated by a distance (B), which forms the baseline for the stereo vision.

The triangulation can be carried out directly from omnidirectional images without the need for image conversion. Once a 3D object (520) is detected, the viewing angle $\gamma_c$ (480-1) and (480-2) can be determined from the geometry of the two cameras (420-1, 420-2). Based on equation (5), the virtual viewing angles $\alpha_1$ (490-1) and $\alpha_2$ (490-2) between the 3D object (520) and the virtual viewing points (440-1, 440-2) can be determined. The distance between one of the virtual viewing point (440-1, 440-2) and the 3D object (520) in the scene can be calculated using straight forward triangulation principles:

$$R = \frac{\cos(\alpha_2)}{\sin(\alpha_1+\alpha_2)}B \quad (6)$$

where R is the Range, i.e. distance between a point in space, such as one on the 3D object (520) and the virtual viewing points (440-1, 440-2).

In other implementations (not shown) an improved imaging apparatus for generating a two dimensional image, includes a substantially hyperbolic reflective mirror configured to satisfy an optical single viewpoint constraint for reflecting a scene, an image sensor responsive to the reflective minor and that generates two dimensional image data signals, and a controller coupled to the image sensor to control a display of two dimensional object scenes corresponding to said image data signals.

Figure 6:
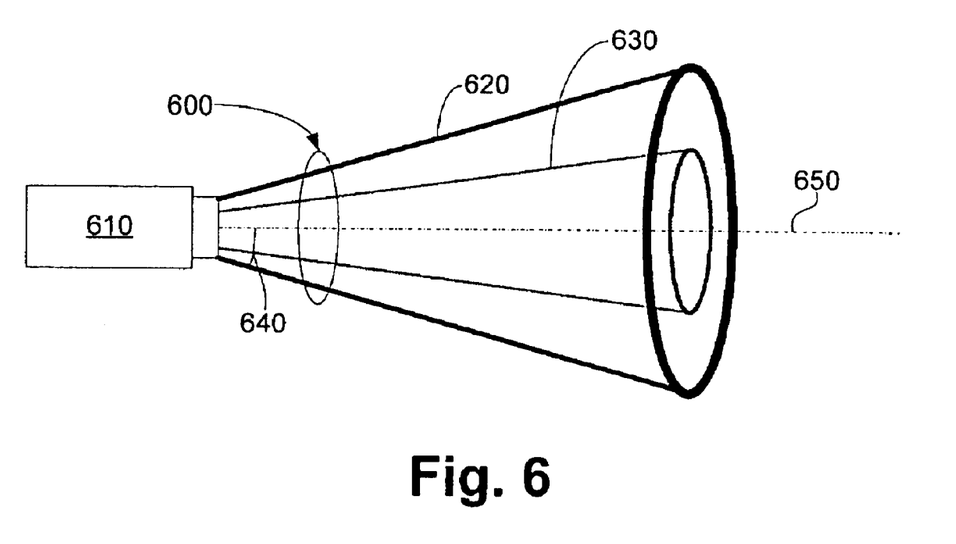
FIG. 6 illustrates a Circular Variable Wavelength Filter (CVWF).

FIG. 6 illustrates a circular variable wavelength filter (CVWF, 600) which may be used to facilitate the generation of 360° projection illumination through a convex mirror. The CVWF (600) is a circular optical glass plate coated with color rings of gradually varying wavelengths within the visible (400–700 nm) or IR (>700 nm) region. The wavelengths of the coated color rings are linearly proportional to their radii as measured from the center of the filter glass, plus an offset. For example, if the range is to be between 400–700 nm, the wavelength in the center of the CVWF would be 400, and would vary linearly with the radius to 700 nm, based on the radius of the CVWF. This feature provides a simple and elegant way of generating structured light for an entire scene without using any moving parts.

As seen in FIG. 6, the CVWF (600) may be used with a white light projector (610) to produce conical sheets of light (620, 630) of varying wavelengths. The wavelength of the light λ passing through a particular position of the CVWF (600) is a linear function of r, the radius measured from the center of the filter glass:

$$\lambda(r) = \lambda_c + \frac{(\lambda_O - \lambda_c)}{R}r \quad (7)$$

where $\lambda_c$, $\lambda_O$ and R are filter parameters: $\lambda_c$ is the wavelength corresponding to the filter's "center" (lowest wavelength color the filter can generate). $\lambda_O$ is the wavelength corresponding to the filter's "edge" (highest wavelength color the filter can generate). R is the effective radian of the filters "edge". And r is the radius measured from the center of the filter glass.

If the relative position of the CVWF (600) is fixed with respect to the white light projector (610), the projected light with the same wavelength forms light sheets of circular conic shapes (620, 630). The cone angle (640) between the light sheet and the normal line of the projector (650) is directly related to the wavelength of the light. In other words, the wavelength of the lights encoded with the geometric information of the projected cone angle. In order to obtain a rainbow-like illumination with a 360° omnidirectional projecting angle, an omni-mirror (410; FIG. 4) may be used to reflect conical-shaped light sheets (620, 630) generated by the white light projector and a CVWF.

Figure 7:
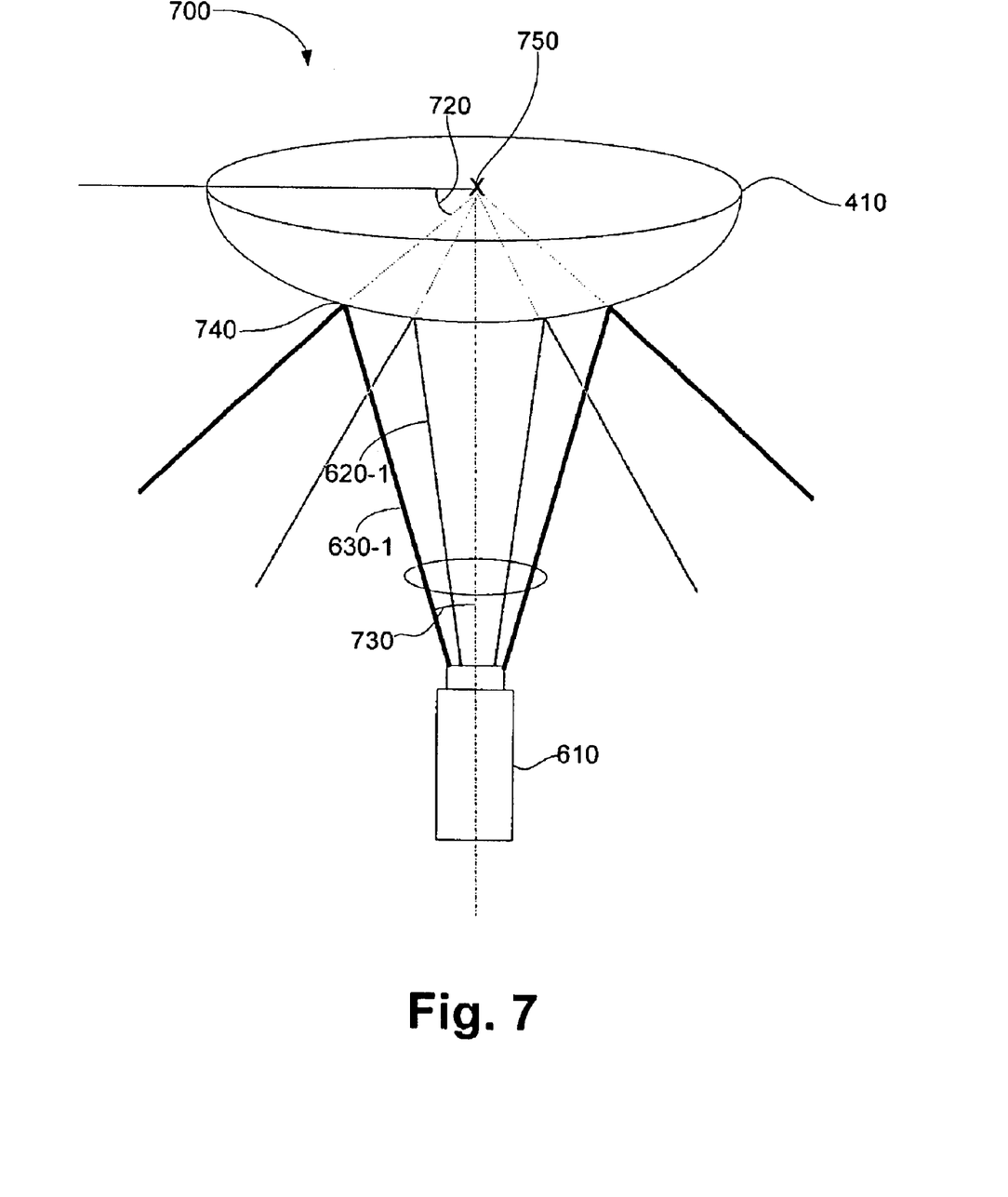
FIG. 7 illustrates omnidirectional light projection system according to one exemplary embodiment.

As shown in FIG. 7, an omnidirectional rainbow light projection system (700) has a 360° effective projecting angle around the vertical axis (710) of an omni-mirror (410).

The omni-mirror mapping provides an easy and elegant way to determine the omni-projecting angle θ (720) of conic light sheets (620-1, 630-1) based on the projection angle γ(730) of the white light projector (610). The projection line equation is given by:

$$z = \frac{r}{\tan \gamma} - f \quad (8)$$

Combining with the omni-mirror equation yields:

$$\frac{(z-c)^2}{b^2} - \frac{r^2}{a^2} = 1, \text{ where } c = \sqrt{a^2 + b^2} \quad (9)$$

The reflecting point (740), which is characterized by the coordinates ($r_{mp}$, $Z_{mp}$) on the omni-mirror (410), can be calculated by solving a quadratic equation. Using some properties of the omni-mirror (410) and simplification procedures in mathematical manipulations, the relationship between the white light projection angle γ(730), and the omni-projection angle θ (720) can then be expressed as:

$$\theta = \tan^{-1} \frac{2bc - (b^2 + c^2)\cos\gamma}{a^2 \sin\gamma} \quad (10)$$

In other words, knowing the white light projection angle γ(730) and parameters of the omni-mirror (410). the omni-projection angle θ (720), which is taken with respect to the virtual projection center (750), is fully determined. Since the value of γ(730) determines the projected wavelength in the rainbow spectrum γ, spatial geometric characteristics of the projected cone shape rainbow light sheets (610-1, 620-1) are fully defined. Although the 3D range calculation of the 3D camera does not require the precise relationship between θ and λ, such a concise relationship facilitates a simple design, implementation and tests of the omnidirectional rainbow light projector (700).

Figure 8:
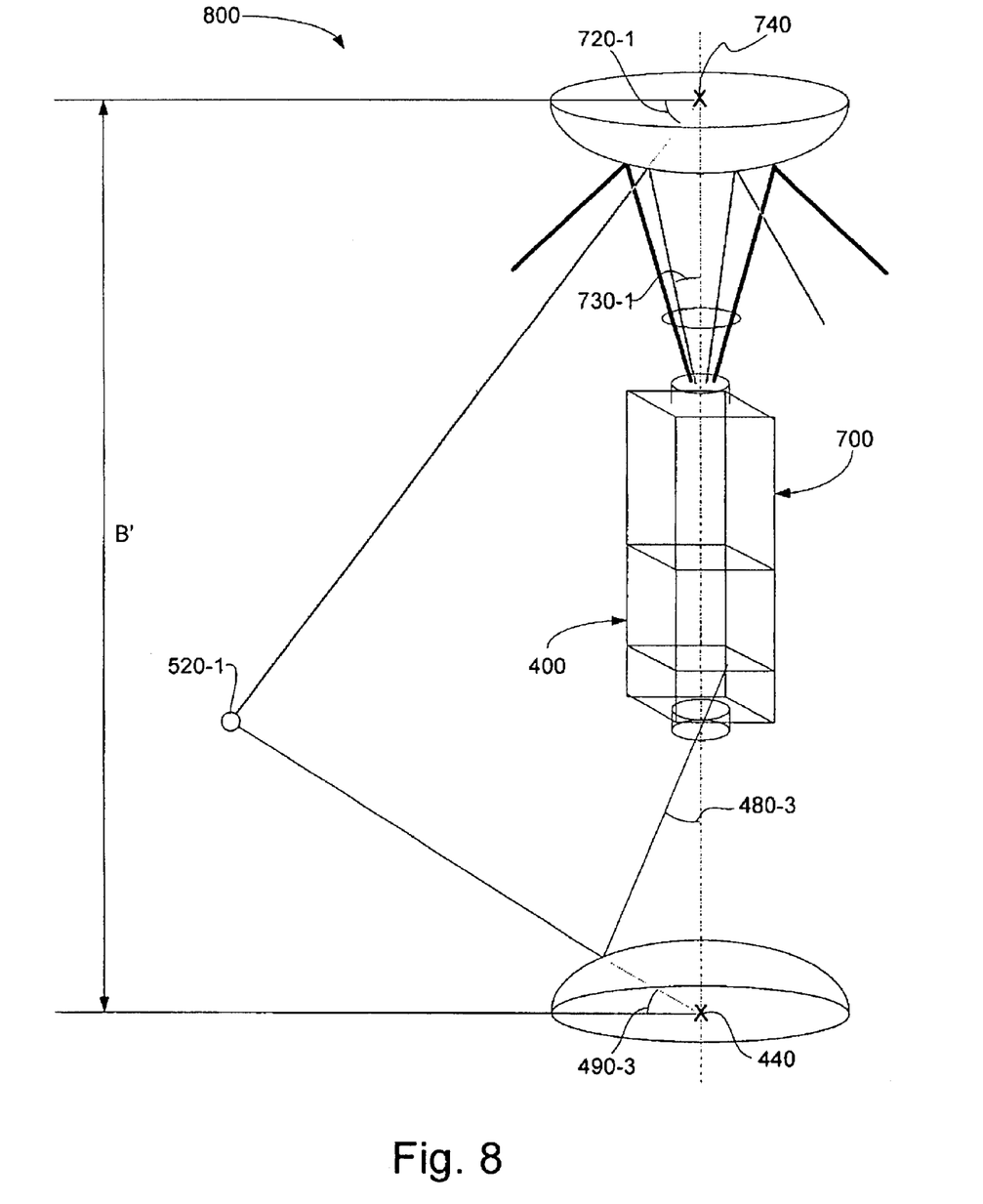
FIG. 8 illustrates an omnidirectional structured light 3D camera according to one exemplary embodiment.

FIG. 8 shows an embodiment of an omni-directional structured light 3D imaging system (800). An omnidirectional rainbow light projector (700) is used to produce a spatially varying wavelength illumination in the surrounding scene. An omnidirectional imaging assembly (400) is placed co-axially (i.e., with optical axes aligned) with the omnidirectional rainbow light projector (700). The virtual projection center, (740), and the virtual imaging center (440), are separated by a distance (B'), which forms the baseline for the triangulation based 3D vision system. The triangulation can be carried out directly from the omnidirectional images without the need for image conversion. Once a 3D object (520-1) is detected in the omnidirectional image, the viewing angle (480-3) is determined from camera's geometry. The projection angle (730-1) is determined from the wavelength of the structured light projection, due to the one-to-one corresponding relationship of the omnidirectional rainbow light projector (700) between the wavelength and the projection angle. The distance between the virtual imaging center (440) and the surface points on the 3D object in the scene can be calculated using straight forward triangulation principle:

$$R = \frac{\cos(\alpha_2)}{\sin(\alpha_1 + \alpha_2)} B \quad (11)$$

where $\alpha_1$ corresponds to the omnidirectional viewing angle (490-3) and $\alpha_2$ corresponds to the projection angle (720-1).

Accordingly, an omnidirectional rainbow light projector and an omnidirectional imaging system may be used together to quickly obtain images with known three-dimensional characteristics about view angle of 360 degrees. The preceding description has been presented only to illustrate and describe embodiments of invention. It is not intended to be exhaustive or to limit the invention to any precise form disclosed. Many modifications and variations are possible in light of the above teaching. It is intended that the scope of the invention be defined by the following claims.

The invention claimed is:

1. An improved imaging apparatus for generating a two dimensional image, comprising:
   a substantially hyperbolic reflective mirror configured to satisfy an optical single viewpoint constraint for reflecting a scene;
   a image sensor responsive to said reflective mirror and that generates two dimensional image data signals; and
   a controller coupled to the image sensor to control a display of two dimensional object scenes corresponding to said image data signals.

2. The improved imaging apparatus of claim 1, wherein said hemispherical image data signals generated by said sensor are projected from a single virtual viewing point at the focal center of said hyperbolic mirror.

3. The improved imaging apparatus of claim 1, wherein said substantially hyperbolic reflective mirror is a substantially convex mirror and wherein said image data signals generated by said sensor means are projected from a single virtual viewing point at the focal center of said convex mirror.

4. An omnidirectonal stereo imaging system comprising:
   a first camera that generates hemispherical image data signals;
   a first substantially hyperbolic reflective mirror optically associated with said first signal generator such that said first camera views objects in an entire hemispherical field of view from a single virtual viewpoint at the focal center of said first reflective mirror;
   a second camera that generates a second set of hemispherical image data signals;
   a second substantially hyperbolic reflective mirror optically associated with said second camera such that said camera views objects in an entire hemispherical field of view from a single virtual viewpoint at the focal center of said second reflective mirror; and
   a data generator responsive to said hemispherical image data signals from said first and second camera for generating three-dimensional data for objects in said hemispherical fields of view of said first and second reflective mirror.

5. The system of claim 4, wherein said first and second cameras point in opposite directions.

6. The system of claim 4, wherein image data signals correspond to acquiring a field of view simultaneously covering 360 degrees of viewing angle.

7. The system of claim 4, wherein a focal center of said first camera and said first hyperbolic reflective mirror are at focal points of a parabolic curve.

8. The system of claim 7, wherein a focal center said second camera and said second hyperbolic reflective mirror are at focal points of a second parabolic curve.

9. The system claim wherein 8, said parabolic curve and said second parabolic curve are substantially similar.

10. An omnidirectional two dimensional imaging system, comprising:

a reflective surface configured to reflect light rays such that extensions of said light rays are substantially coincident on single viewing point; and an imaging system configured to cover the entire surface of said omni-mirror.

11. The system of claim 10, wherein said reflective surface comprises a substantially hyperbolic mirror.

12. The system of claim 11, wherein said hyperbolic mirror first and second focal points in which said single viewing point is at said first focal point and a focal point of said imaging system is at said second focal point.

13. The system claim 11, wherein said imaging system comprises a camera.

14. The system claim 10, wherein said imaging system is configured to capture an image through a 360 degree viewing angle.

15. An omnidirectional stereo imaging system, comprising:

a first omnidirectional imaging assembly having a first imaging device and a first omni-mirror wherein a viewing point of said omni-mirror and a focal point of said imaging device are disposed on focal points of a hyperbolic curve;

a second omnidirectional imaging assembly having a second imaging device and a second omni-mirror wherein a viewing point of said omni-mirror and a focal point of said imaging device are disposed on focal points of a hyperbolic curve wherein focal centers of said first and second omni-mirrors and focal points of said first and second imaging devices are substantially coaxial; and wherein said virtual viewing points are separated by a predetermined distance.

16. The system of claim 15, wherein said imaging systems comprise first and second cameras that generate hemispherical image data signals.

17. The system of claim 16, further comprising a data generator responsive to said hemispherical image data signals from said first and second imaging devices for generating three-dimensional data for objects in fields of view of said first and second omni-mirrors.

18. The system of claim 16, wherein said first omni-mirror comprises a substantially hyperbolic reflective mirror optically associated with said first imaging device such that said first imaging views objects through a 360 degree field of view from a first virtual viewpoint at a focal center of said first camera and said second omni-mirror comprises a second substantially hyperbolic reflective mirror optically associated with said second imaging device such that said second imaging device objects in through a 360 degree field of view from a second virtual viewpoint at the focal center of said second reflective mirror.

19. The system of claim 15, wherein said first and second imaging devices comprise cameras.

* * * * *